Feb. 19, 1935.　　　L. E. BROUGHAM　　　1,991,729
RECORD CARD CONTROLLED STATISTICAL MACHINE
Filed March 7, 1933　　　3 Sheets-Sheet 1
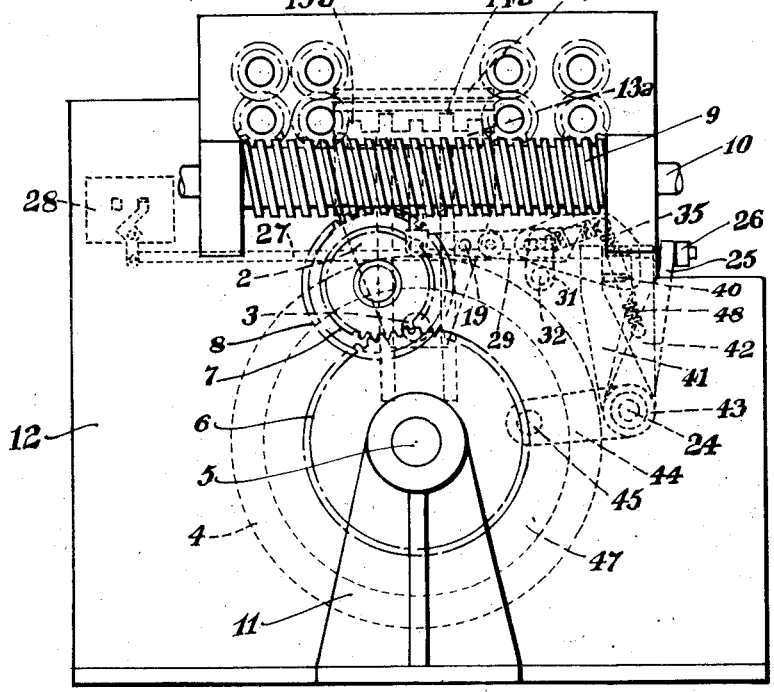
Inventor.
L. E. BROUGHAM.
Per Sydney L. Page.
Attorney.

Feb. 19, 1935.   L. E. BROUGHAM   1,991,729
RECORD CARD CONTROLLED STATISTICAL MACHINE
Filed March 7, 1933   3 Sheets-Sheet 2
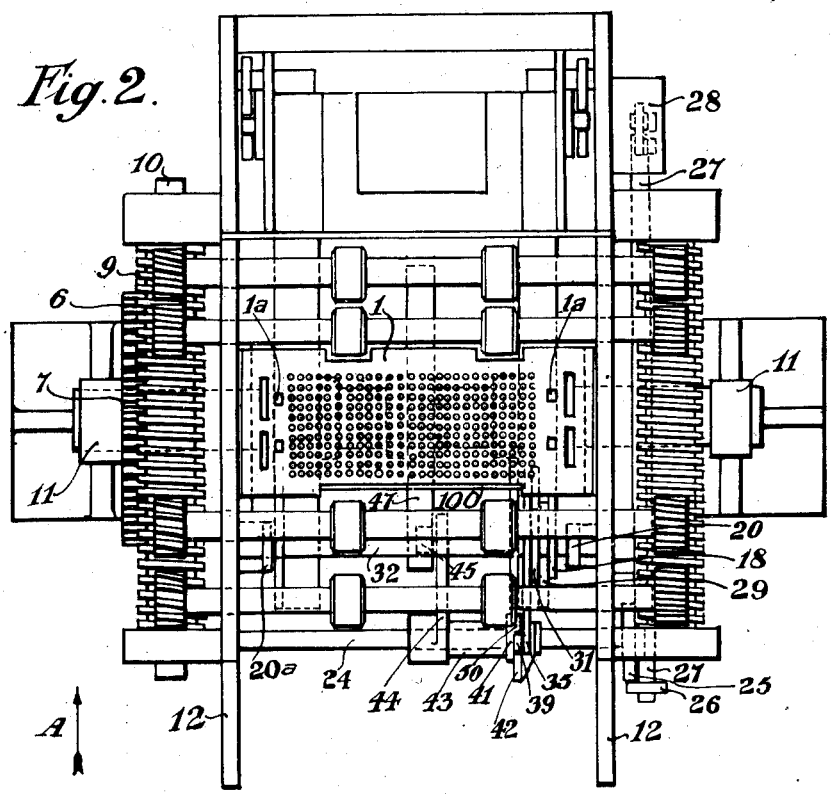
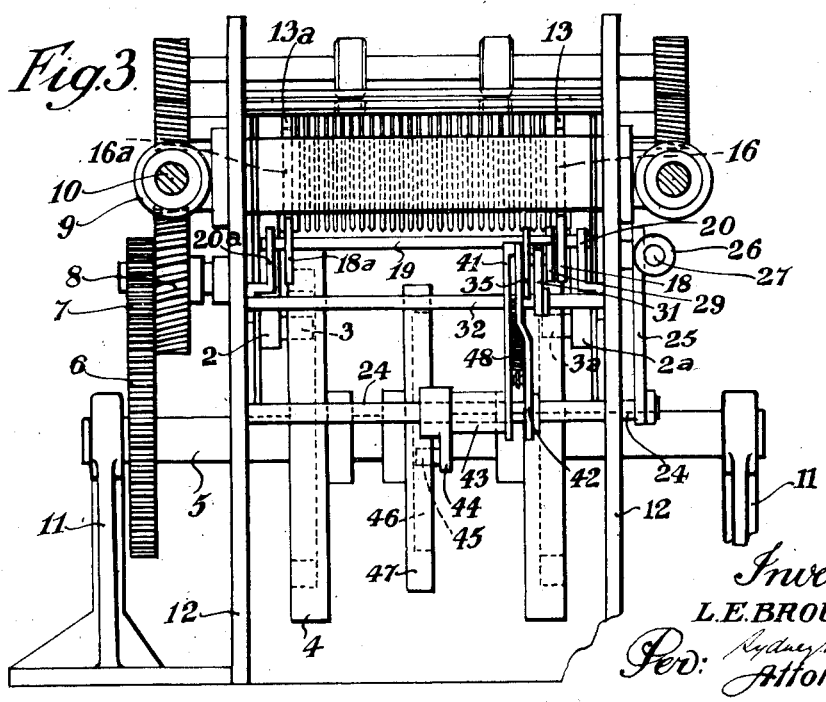
Inventor
L. E. BROUGHAM Feb. 19, 1935.  L. E. BROUGHAM  1,991,729
RECORD CARD CONTROLLED STATISTICAL MACHINE
Filed March 7, 1933   3 Sheets-Sheet 3
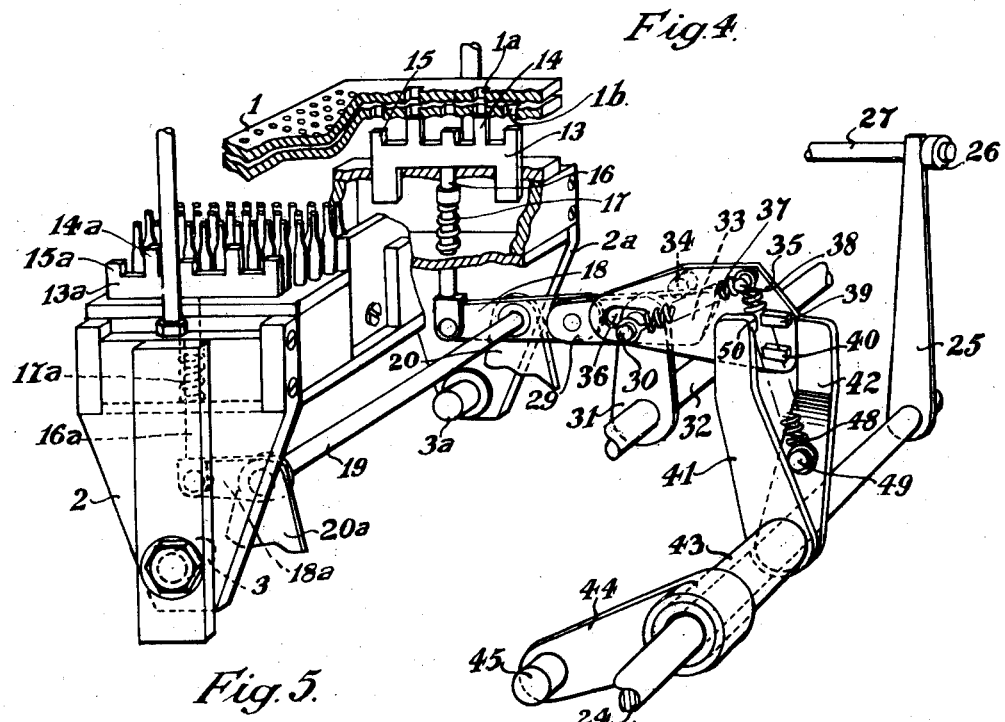
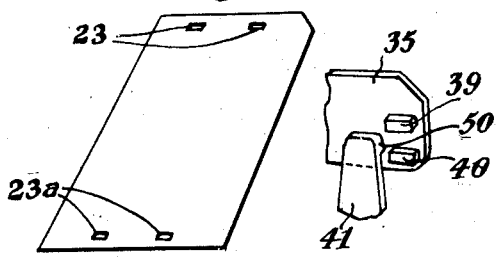
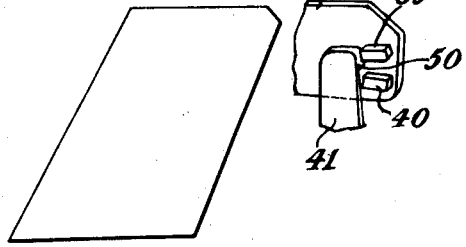
Inventor.
L. E. BROUGHAM.
Per: Sydney E. Page
Attorney.

Patented Feb. 19, 1935

1,991,729

UNITED STATES PATENT OFFICE 1,991,729

RECORD CARD CONTROLLED STATISTICAL MACHINE

Leslie Ernest Brougham, Purley, England, assignor to The Accounting & Tabulating Corporation of Great Britain Limited, London, England Application March 7, 1933, Serial No. 659,931
In Great Britain March 9, 1932

7 Claims. (Cl. 101—1)

This invention relates to record card controlled statistical machines and has for its main object to provide means for giving an indication or stopping the machine when a card is incorrectly presented to the analyzing device of the machine.

The invention relates more particularly to that type of statistical machine in which the cards are delivered from a magazine (by means of a picker) to a plurality of feed rolls which feed the cards) to an analyzing device in which they are analyzed while stationary. The feed rolls employed in this operation may grip the card at its opposite ends or they may grip it throughout its length but in either case the feed rolls have to be carefully adjusted both in regard to their position in the machine and in regard to their speed of revolution in order to ensure the card being accurately presented to the analyzing device. Such a machine is described in Powers' United States patent specification No. 1,245,502.

If, however, in spite of the general accuracy of operation of the machine or due to a card being damaged or worn, a card should become incorrectly presented to the analyzing device, the resulting error may involve a great loss of time.

In the case of a tabulator accumulating and printing totals of items recorded on the cards an error due to incorrect feeding of a single card may cause a serious discrepancy in the final total of a large number of items, and although the probability of such an error occurring in practice is exceedingly remote it does occur and it is necessary to provide means for detecting incorrect feeding of a card immediately it has occurred in order to obviate the loss of time otherwise involved in searching for the error. It is also possible for cards to be sometimes inserted in the machine the wrong way round, and it is imperative that such a fault be detected at once.

To the above ends according to one form of the present invention, a statistical machine having an analyzing device in the form of reciprocating sensing pins comprises means for setting or arresting the passage of the card at the sensing zone and register members at each side of the card path adapted to sense each card and test the correctness of its position, and means controlled by said register members to give an indication or signal when a card is incorrectly positioned with respect to the sensing pins.

Preferably an operative connection is provided between the register members and the controls of the machine whereby the machine is stopped when a card is incorrectly positioned.

Preferably each register member is in the form of two or more pins adapted to be moved into engagement with the card by the pin box through the intermediary of a yielding connection, for example a spring. Each card is provided at each of its sides with a number of register notches, holes or slots, corresponding to the number of register pins employed. The register pins are so disposed with regard to the sensing pins and the register holes or slots are so disposed with regard to the sensing hole positions on the card that to the sensing hole positions for sensing, the when a card is in correct position for sensing, the register pins can pass through the register holes or slots in the card under the action of their springs.

If, however, the card is incorrectly positioned one or other of the register pins will engage with the edge of its hole and will consequently fail to pass through the card. Operative connections are provided between the register pins and the mechanism for controlling the machine, whereby when any register pin fails to pass through a card the machine is stopped.

Thus the register pins may also be utilized for stopping the machine by passing a blank card through the machine which will prevent any of the register pins from passing through the card.

One construction according to the invention is illustrated by way of example in the accompanying drawings in which the invention is shown as applied to a tabulating machine of the type exemplified by that described in Powers' United States patent specification No. 1,245,502, and the register pins are employed to control the stopping of the machine when a card is incorrectly positioned in the pin box.

In the drawings:

Fig. 1 illustrates in side elevation that part of the machine embodying the mechanism according to the invention;

Fig. 2 is a plan of the mechanism shown in Fig. 1;

Fig. 3 is an elevation looking in the direction of the arrow A in Fig. 2;

Fig. 4 shows the mechanism according to the invention in perspective;

Fig. 5 illustrates a normal item card and the position of certain parts of the control mechanism when the item card is correctly positioned;

Fig. 6 illustrates the position of parts of the control mechanism for stopping the machine;

Fig. 7 shows the position of parts of the control mechanism when there is no card in the machine; and Fig. 8 illustrates one form of card for use with the mechanism according to the invention.

In the drawings like reference numerals designate the same or similar parts.

In the construction illustrated in the drawings the pin box is similar to that described in United States patent specification No. 1,245,502 and is disposed below the usual stationary perforated pin plates 1. The pin box is provided with downwardly extending side plates 2 carrying pins 3 which engage with tracks formed in cam discs 4 secured to a shaft 5. The pin box is reciprocated vertically by means of the cam discs 4, the shaft 5 being rotated through gearing 6, 7 and 8 driven through a worm 9 on a main shaft 10 which is operated from an electric motor (not shown).

The shaft 5 is supported in bearings 11 disposed outside the side plates 12 of the framework of the mechanism, and the gearing 6, 7, 8 is also disposed outside the plates 12 to the left in Fig. 3. The cam discs 4 together with the mechanism according to the invention are disposed between the plates 12.

Disposed at each side of the pin box is a register member in the form of a bar 13, 13a. The bar 13 carries two register pins 14 and three abutment pins 15, one at each end of the bar and one located between the register pins. Similarly, the bar 13a carries two register pins 14a and two abutment pins 15a. The bar 13 is carried in a horizontal position on a vertical rod 16 freely mounted in the frame of the tabulator sensing pin box and provided with a spring 17 in the same manner as are the sensing pins. Similarly, the bar 13a is carried on a vertical rod 16a provided with a spring 17a. The perforated sensing plates 1 are provided with two register holes 1a at each side through which the register pins 14 and 14a may pass, and with three further holes 1b through which the abutment pins 15, 15a may pass. The pin box may be similar in construction and operation to that described in United States patent specification No. 1,245,502, but is extended at each side to accommodate the supporting rods 16, 16a for the bars 13, 13a carrying the register pins 14, 14a.

The lower end of one of these supporting rods 16 is pivoted to a lever 18 secured to a cross shaft 19, while the lower end of the other supporting rod 16a is pivoted to a similar lever 18a which is also secured to the cross shaft 19. The cross shaft 19 is freely supported in brackets 20, 20a secured to the side plates 12 of the framework of the mechanism.

For operation with this form of machine each normal item record card is provided with two holes at each side, outside the usual columns provided for record holes, adapted to engage with the two register pins 14, 14a at each side of the pin box and the abutment pins 15, 15a are made shorter than the register pins and of such length that when the register pins pass through the register holes in a card the abutment pins rest against the surface of the card.

An example of a record card for use with the invention is illustrated in Fig. 8, the card being shown in the form in which it is sold, i. e. without any record perforations therein.

On this card the whole of the area lying within the dotted lines 21 is available for the punching of record perforations and may be printed with the usual columns of index numerals, generally 45 in number. The part of the card within the dotted lines 21 is therefore approximately equal in area to the usual record card hitherto known. At each side, however, the card is extended to form marginal portions 22, 22a, in which are formed register holes 23, 23a which co-operate with the register pins 14, 14a already described. These holes are formed simultaneously with the operation of stamping the card blank out of a sheet or strip of card material.

Thus it will be seen that the marginal portions 22 and 22a are outside the area occupied by the usual columns for item perforations and that the employment of the register holes 23, 23a does not reduce the space available for item holes.

In a similar manner the holes 1a at each end of the perforated sensing plates 1 in the machine are placed outside the area of the perforations corresponding to the index positions on the cards.

In order to enable the invention to be more clearly understood the operation of the mechanism according thereto will be briefly described before describing the details thereof.

Taking first the case of a record card which is correctly located in the pin box, the latter rises to sense the item perforations in the card, and the register pins 14, 14a at both sides of the pin box pass through the register holes 23, 23a in the margins 22, 22a of the card, whereby the operation of the machine is permitted to continue without interruption. If, however, the card is incorrectly located in the pin box, the register pins 14, 14a will engage with the edges of the corresponding register holes 23, 23a and consequently will be held down by the card. This failure of the register pins to rise will cause the machine to stop by means of mechanism which will be hereinafter described.

The actual mechanism for effecting stopping of the machine forms no part of the present invention, and consequently will not be described here. Such stopping mechanism may include a knock-off shaft 24 carrying an arm 25 bearing against a collar 26 on a switch rod 27 similar to the switch rod 33 described in Powers' United States patent specification No. 1,245,506. The switch rod 27 operates an electric switch 28 controlling the source of power to the machine.

It will thus be seen that when the machine is running a rocking movement of the knock-off shaft 24 will move the switch rod 25 to effect stopping of the machine.

This rocking of the knock-off shaft 24 is controlled by means of the register pins 14, 14a which, as has already been described, are carried on horizontal bars 13, 13a supported on rods 16, 16a of which the lower ends are respectively pivoted to the ends of levers 18, 18a secured to the cross shaft 19. The other end of the lever 18 is pivoted to a second lever 29 which in turn is pivoted between its ends on a pin 30 projecting from an arm 31 attached to a rod 32 fixed in the side plates 12 of the mechanism. The arm 31 is disposed vertically and the pin 30 referred to above projects laterally from the upper end of the arm. The end 33 of this second lever 29 remote from the register pins serves as an abutment for a projection 34 carried on an intermediate lever 35 also pivoted on the pin 30. The pin 30 projects through a slot 36 in the intermediate lever 35 whereby the latter can slide longitudinally on the pin 30 in addition to pivoting thereon (Fig. 4). A spring 37 is anchored at one end to a pin 38 on the intermediate lever 35 and at the other end to the pin 30 so that the lever 35 is normally held over to the left in Fig. 4.

The free end of the intermediate lever 35 carries two abutments 39 and 40 spaced apart one above the other and adapted to co-operate, in a manner which will shortly be explained, with two vertical levers, one of which will for convenience be termed the driving lever 41 and the other the driven lever 42. Of these two vertical levers, the driving lever is carried on a sleeve 43 freely mounted on the knock-off shaft 24, while the driven lever 42 is fixed to the knock-off shaft. The sleeve 43 also carries an arm 44 of which the free end carries a roll 45 engaging with a groove 46 in a rotating cam 47 (Figs. 1, 2 and 3) adapted to make one revolution for every cycle of the machine. As the cam 47 rotates the arm 44 is rocked clockwise and back and consequently the driving lever 41 is rocked also.

Also anchored to the pin 38 on the intermediate lever 35 is a spring 48 of which the other end is anchored to a pin 49 on the driven lever 42. By means of this spring 48 the right hand end of the intermediate lever 35 (in Fig. 4) tends to be pulled downwards, whereby the projection 34 on the lever 35 always tends to remain in contact with the upper edge of the lever 29. The spring 48 opposes the springs 17, 17a, but is much weaker than they.

The driving lever 41 carries at its upper end a lateral projection 50 which can pass between the abutments 39, 40 on the intermediate lever 35 or can engage with one or other of them. The upper end of the driven lever 42 is in engagement with both abutments 39 and 40, the arrangement being such that the abutments lie between the lateral projection 50 on the driving lever 41 and the upper end 42a of the driven lever 42. Consequently, if the intermediate lever 35 turns about the pin 30 so that one or other of the abutments 39, 40 comes into register with the lateral projection 50 on the driving lever 41, the rocking movement of the latter in a clockwise direction will be transmitted through the abutment 39 or 40 to the driven lever 42 and the knock-off shaft 24 will be rocked and the switch 28 will be operated to stop the machine.

The operation of the mechanism will now be described.

A record card of the form shown in Fig. 8 is fed into the pin box between the perforated pin plates 1 and is arrested by the usual card stop 100 (Fig. 2). The construction and operation of this card stop is described in Powers' United States patent specification No. 1,245,502 already referred to.

The pin box rises to sense the item perforations in the card and with it rise the bars 13, 13a carrying the register pins 14, 14a and the abutment pins 15, 15a. If the card is correctly positioned for sensing the register pins 14, 14a will pass through the register holes 23, 23a in the marginal portions 22, 22a of the card (see Fig. 8) and the bars 13, 13a will continue to rise with the pin box until the abutment pins 15, 15a come into contact with the under-surface of the card. The pin box continues to move up to the top of its stroke leaving the bars 13, 13a behind at the expense of compressing the springs 17, 17a surrounding the supporting rods 16, 16a for these bars 13, 13a.

Fig. 4 shows the parts in the positions which they occupy when the pin box and bars 13, 13a are at the bottom of their stroke. The abutments 39 and 40 on the intermediate lever 35 are so placed that when the bars 13, 13a are at the bottom of their stroke the upper abutment 39 lies between the lateral projection 50 on the driving lever 41 and the upper end of the driven lever 42.

At this time, however, the driving lever 41 is stationary in the position shown in Fig. 4, and consequently no movement is imparted to the driven lever 42.

When, however, the bars 13, 13a rise with the pin box until arrested by the engagement of the abutment pins 15, 15a with the underside of the card, the levers 18, 18a are rocked in a clockwise direction about the shaft 19. Consequently the lever 29 is rocked in an anti-clockwise direction about the pivot pin 30 and its right hand end 33 acting on the pin 34 swings the intermediate lever 35 also in an anti-clockwise direction about the pivot pin 30. This movement of the intermediate lever 35 is just sufficient to raise the upper abutment 39 clear of the lateral projection 50 on the upper end of the driving lever 41 but not sufficient to bring the lower abutment 40 into the path of this projection 50 (Figs. 4 and 5). The cam disc 47 then operates to swing the driving lever 41 in a clockwise direction and back again (Fig. 4), but as neither abutment 39, 40 is in the path of the projection 50, this movement is idle and is not transmitted to the driven lever 42. It should be observed in this connection that the cam 47 is so set with respect to the pin box operating cam 4 that the cam 47 effects this swinging movement of the driving lever 41 at the point in the cycle when the pin box is stationary at the top of the stroke.

Since the driven lever 42 remains stationary, the knock-off shaft 24 is not moved and consequently the machine continues to run uninterruptedly.

If, however, a card is fed into the pin box incorrectly, for example, if by reason of the card being damaged, it comes to rest in a position which will not permit the item sensing pins to pass clearly through the item perforations, the mechanism according to the invention causes rocking of the knock-off shaft whereby the machine is stopped. The sequence of operations to effect this result will now be described.

The register holes 23, 23a, in the card are of such a size that the register pins 14, 14a, can just pass through them if the card is correctly set in the pin box. If, however, the card is slightly askew one or more of the register pins 14, 14a on rising will engage with the edges of their corresponding register holes 23, 23a. Consequently, the bars 13, 13a will be prevented from rising with the pin box and will remain substantially in the position shown in Figs. 4 and 6. They will in fact rise to a slight extent, but this movement is in practice very small and insufficient to raise the upper abutment 39 clear of the lateral projection 50 on the driving lever 41. Consequently, when the latter swings clockwise under the control of its cam 47, the abutment 39 will be between the projection 50 and the upper end of the driven lever 42. Therefore, the movement of the driving lever 41 will be imparted to the driven lever 42 which will also be swung clockwise, whereby the knock-off shaft 24 to which this lever 42 is fixed will be rocked clockwise and through the agency of its arm 25 will pull the rod 27 to the right in Figs. 1 and 4, thereby operating the switch 28 to stop the machine. In this connection it should be noted that the slot 36 in the intermediate lever 35 permits it to move bodily to the right in Fig. 4 when the driving lever 41 swings in the clockwise direction.

The same result will be obtained by feeding into the pin box a card having no register holes in its margins 22, 22a, such a card acting as a stop card.

If, on the other hand, there is no card in the pin box the bars 13 and 13a will rise with the pin box to the top of its stroke, the register pins 14, 14a and the abutment pins 15, 15a both being unobstructed and therefore able to pass through their corresponding holes 1a and 1b in the pin plates 1. This movement of the bars 13 and 13a is sufficient to raise the right hand end of the intermediate lever 35 to such an extent that the lower abutment 40 is brought into the path of the projection 50 on the driving lever 41 (see Fig. 7). Consequently, when the driving lever 41 is moved clockwise it carries with it the driven lever 42 through the agency of the lower projection 40, whereby the knock-off shaft 24 is rocked and the machine stopped as described above.

It will be understood that the invention also includes as one of its features a statistical record card having two or more register holes at both of its sides disposed outside the usual item columns on the cards. The holes may be round, square, or of any desired form. Also, instead of employing a card having holes formed therein, the card may be provided with two or more open slots or serrations at its ends to engage with the register pins. Again, the register holes may be replaced by one or more elongated slots at each side of the card.

The holes at each side of the card are preferably not symmetrically disposed so that the machine will stop if cards are reversed, although it is possible to arrange them symmetrically if it is desired that the machine may be properly operated when the card is reversed as when adding the complements of numbers. Further, if the holes at each side of the card are symmetrically disposed, it is unnecessary to provide as many register pins as there are holes, since although the register pins need not be symmetrical the symmetry of the holes renders it possible to reverse the card for complementary adding. In fact, a card having only one register hole at each side will be suitable, provided that the holes are on the centre line of the card.

Although the invention has been particularly described as applied to a tabulating machine, it will be understood that it is equally well applicable to any statistical machine having mechanical sensing members, such for example, as a sorting machine.

What I claim is:—

1. In a statistical machine having an analyzing device including sensing pins, means for reciprocating said pins and means for arresting the passage of a card at the sensing zone, the combination of register members spaced so wide apart as to test the positions of both ends of each card, and a single means operable by said register members to give an indication when a card is incorrectly positioned with respect to the sensing pins.

2. In a statistical machine having an analyzing device including sensing pins, means for reciprocating said pins and means for arresting the passage of a card at the sensing zone, the combination of register members at each side of the card path disposed to sense each card and test the correctness of its position, means for stopping the machine, and an operative connection between the register members and said stopping means, whereby the machine is stopped when a card is incorrectly positioned with respect to the sensing pins.

3. In a statistical machine having an analyzing device including sensing pins, means for reciprocating said pins and means for arresting the passage of a card at the sensing zone, the combination of a register bar at each side of the card path carrying a plurality of register pins and a plurality of shorter abutment pins, said register pins being adapted to pass through corresponding register holes in the card while the abutment pins engage with the unperforated surface of the card, a yielding connection between the register bars and the means for reciprocating the sensing pins whereby the register bars are reciprocated synchronously with and in the same direction as the sensing pins, a control member, two abutments on said control member, a lever, means for rocking said lever, an operative connection between the register bars and the control member whereby when the register pins pass through holes in a card and the abutment pins engage with the unperforated surface of the card, the control member takes up a position in which its abutments are clear of the rocking lever, whereas when an incorrectly positioned card is sensed, the control member takes up a position in which one of its abutments is in the path of the rocking lever whereby the control member is moved and when no card is in the sensing zone the control member takes up a position in which the other abutment is in the path of the rocking lever, whereby the control member is likewise moved, means for stopping the machine and an operative connection between the control member and said stopping means, whereby when the control member is moved the machine stops.

4. In a machine of the class described, the combination of a card chamber, a plurality of feelers acting to sense the position of the card at a plurality of points two of which are approximately at opposite ends of the card, means for moving said plurality of feelers in unison to sensing position, and means controlled by said feeler-moving means for stopping the machine in case any one of the feelers finds the card out of position.

5. In a machine of the class described, the combination of a card chamber, feeling devices, means for yieldingly moving said devices into engagement with the card, said devices including feelers adapted to enter holes spaced wide apart in a properly positioned card and a feeler adapted to be arrested by a properly positioned card, so that said moving means may be arrested in one position if a card is improperly positioned in the chamber, in another position if the card is properly positioned in the chamber, and in a third position if there is no card in the chamber, and means acting automatically in the first and third said positions to stop the machine.

6. In a machine of the class described, the combination of a statistical card having one or more holes at each of its opposite sides outside the area occupied by the item columns of the card, a chamber in which said card is sensed, feelers for sensing the correctness of the position of said card in said chamber, and a single automatic means for giving a suitable indication in case any of said feelers fails to enter the appropriate hole.

7. In a machine of the class described, the combination with a card chamber and mechanism for analyzing perforated cards, of detector mechanism comprising a plurality of feelers spaced so far apart as to sense the proper positioning of both ends of the card and connected to move in unison, a common part moving in unison with said feelers, and means controlled by said common part for giving a suitable indication in case the card is not placed properly.

LESLIE ERNEST BROUGHAM.